United States Patent [19]

Awaji et al.

[11] Patent Number: 5,722,521
[45] Date of Patent: Mar. 3, 1998

[54] ROLLER TYPE ONE-WAY CLUTCH

[75] Inventors: Toshio Awaji; Hirofumi Ogata, both of Fukuroi; Yoshio Kinoshita, Shizuoka-ken, all of Japan

[73] Assignee: NSK-Warner K.K., Tokyo, Japan

[21] Appl. No.: 654,554

[22] Filed: May 29, 1996

[30] Foreign Application Priority Data

Jun. 1, 1995 [JP] Japan ..................... 7-135298

[51] Int. Cl.$^6$ ..................... F16D 41/066
[52] U.S. Cl. ..................... 192/45; 188/82.84
[58] Field of Search ..................... 192/45, 44; 188/82.84

[56] References Cited

U.S. PATENT DOCUMENTS

| | | | |
|---|---|---|---|
| 2,973,847 | 3/1961 | Stockton | 192/45 |
| 3,238,814 | 3/1966 | Jandasek | 192/45 X |
| 3,937,311 | 2/1976 | Gehrke | 192/45 |
| 5,372,227 | 12/1994 | Kinoshita et al. | 192/45 |

FOREIGN PATENT DOCUMENTS

| 128470 | 5/1932 | Austria | 192/45 |
|---|---|---|---|

Primary Examiner—Richard M. Lorence
Attorney, Agent, or Firm—Shapiro and Shapiro

[57] ABSTRACT

In a roller type one-way clutch before an inner race contacts with rollers, the inner race is centered by a pad bearing, whereby it becomes unnecessary to use a special assembling jig and also the working property of assembly can be improved without increasing the number of steps of assembling the one-way clutch. The roller type one-way clutch comprises an outer race having an axially extending annular inner peripheral cam surface, an inner race disposed inside the outer race and having an annular outer peripheral raceway surface, the outer race and the inner race being space apart from each other and disposed concentrically with each other for rotation relative to each other, a roller member disposed between the outer race and the inner race for transmitting a torque between the outer peripheral raceway surface and the inner peripheral cam surface, and a pad bearing for centering the inner race relative to the outer race, the roller member having on at least one of the axial opposite end portions thereof a chamfered portion chamfered over the entire periphery thereof.

3 Claims, 4 Drawing Sheets

5,722,521

1

ROLLER TYPE ONE-WAY CLUTCH

BACKGROUND OF THE INVENTION

1. Field of the Invention

This invention relates to a roller type one-way clutch for use as a part, for example, for torque transmission, back stop or the like in the driving apparatus of an automobile, an industrial machine or the like, and more particularly to a roller type one-way clutch in which the assembly of an inner race is made easy.

2. Related Background Art

Generally, a roller type one-way clutch, as shown in FIG. 6 of the accompanying drawings, comprises an outer race 10, an inner race 20 disposed concentrically with the outer race 10, a plurality of rollers 50 disposed between the outer peripheral surface of the inner race 20 and the inner peripheral cam surface 90 of the outer race 10, a pad bearing 100 effecting the centering of the outer race 10 and the inner race 20 and also guiding the rollers 50, springs 70 in contact with the idle rotation side of the rollers 50, and a mounting plate 80 for the springs 70. The rollers 50 are prevented from slipping off in the axial direction thereof by a side plate 60.

In such a construction, the one-way clutch is designed such that the inner race 20 is rotated only in one direction relative to the outer race 10 by a cam mechanism constituted by the rollers 50 and the cam surface 90. That is, the inner race 20 is idly rotated in the direction of arrow Z in FIG. 6 relative to the outer race 10 and gives a rotational torque to the outer race 10 through the cam mechanism only in the opposite direction.

The pad bearing 100 guides the rollers 50 and also effects the centering of the inner race 20 relative to the outer race 10, and the assembly of the pad bearing 100 to the one-way clutch, particularly to the inner race 20, is done in the following manner.

Referring to FIG. 7 of the accompanying drawings which shows the state of the inner race 20 before assembly, the rollers 50 are urged toward the meshing side by the springs 70, and the diameter B of the inscribed circle of the roller 50 to the inner race 20 is smaller than the diameter A of the inscribed circle of the pad bearing 100 to the inner race 20.

When in this state, the inner race 20 is inserted axially thereof, the inner race 20 first contacts with the rollers 50, and to insert the inner race 20 further inwardly, the rollers 50 must be pushed aside and the inner race 20 or the outer race 10 must be pushed in while being rotated toward the idle rotation side (in the direction of arrow X in FIG. 7).

However, the inner race 20 contacts with one or more of the rollers 50 before it is centered by the pad bearing 100 and therefore, the center of the inscribed circle of the rollers 50 to the inner race 20 becomes liable to deviate and a number of rollers 50 present in the circumferential direction do not uniformly move in the direction of idle rotation and thus, assembly becomes difficult and it becomes necessary to use a special assembling jig. In such a case, there has been the problem that the number of steps of assembling the one-way clutch increases and the assembly process becomes difficult.

SUMMARY OF THE INVENTION

It is an object of the present invention to provide a roller type one-way clutch in which before an inner race contacts with rollers, the inner race is centered by a pad bearing, whereby it becomes unnecessary to use a special assembling jig and also the assembly process can be improved without increasing the number of steps of assembling the one-way clutch.

2

To achieve the above object, the roller type one-way clutch of the present invention is a roller type one-way clutch comprising an outer race having an axially extending annular inner peripheral cam surface, an inner race disposed inside the outer race and having an annular outer peripheral raceway surface, the outer race and the inner race being disposed concentrically with each other for rotation relative to each other, a roller member disposed between the outer race and the inner race for transmitting a torque between the outer peripheral raceway surface and the inner peripheral cam surface, and a pad bearing for centering the inner race relative to the outer race, characterized in that the roller member has on at least one of the axial opposite end portions thereof a chamfered portion chamfered over the entire periphery thereof.

According to the present invention, the inner race is already centered by the pad bearing at a point of time whereat it has contacted with the roller member and therefore, the roller member uniformly moves in the direction of idle rotation and assembly becomes easy.

DESCRIPTION OF THE PREFERRED EMBODIMENT

Figure 1:
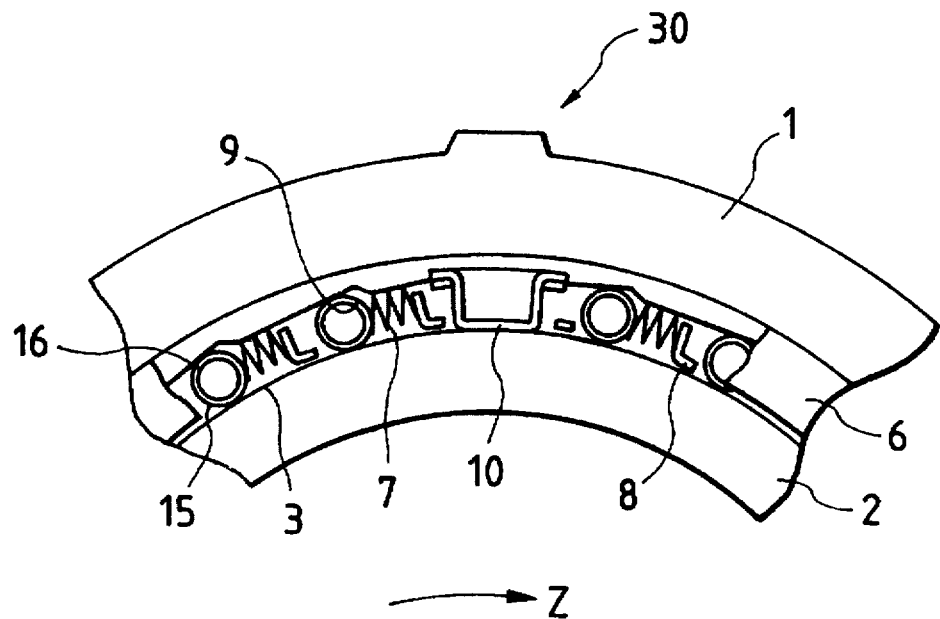
FIG. 1 is a partly broken-away radial cross-sectional view of a roller type one-way clutch according to an embodiment of the present invention.

The invention will hereinafter be described in detail with reference to the drawings. An embodiment which will hereinafter be described is one which exemplarily illustrates the present invention, and of course is not one which restricts the present invention. Also, throughout the drawings, like portions are designated by like reference numerals.

FIG. 1 is a partly broken-away radial cross-sectional view showing a roller type one-way clutch 30 according to an embodiment of the present invention. In the ensuring description, for the simplification of description, the "roller type one-way clutch" is simply referred to as the "one-way clutch". The one-way clutch 30 comprises an outer race 1, an inner race 2 disposed concentrically with the outer race 1, a plurality of roller members, i.e., 15 disposed between the outer peripheral raceway surface 3 of the inner race 2 and the inner peripheral cam surface 9 of the outer race 1, a pad bearing 10 for effecting the centering of the outer race 1 and the inner race 2 and also guiding the rollers 15, springs 7 in contact with the idle rotation side of the rollers 15, and a mounting plate 8 for the springs 7. The rollers 15 are prevented from slipping off in the axial direction thereof by a side plate 6.

In such a construction, the one-way clutch 30 is designed such that the inner race 2 is rotated only in one direction relative to the outer race 1 by a cam mechanism constituted by the rollers 15 and the inner peripheral cam surface 9. That is, the inner race 2 is idly rotated in the direction of arrow Z in FIG. 1 relative to the outer race 1, and gives a rotational torque to the outer race 1 through the cam mechanism only in the opposite direction (the direction of arrow X in FIG. 2).

The pad bearing 10 guides the rollers 15 and also centers the inner race 2 relative to the outer race 1, and the assembly of the pad bearing 10 to the one-way clutch 30, particularly to the inner race 2, is effected as follows.

Figure 2:
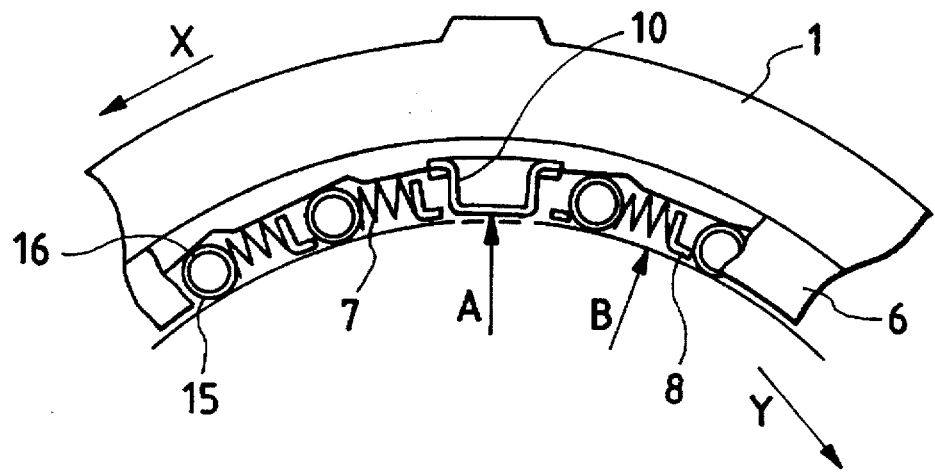
FIG. 2 is a radial cross-sectional view of the roller type one-way clutch of FIG. 1 showing the state before the assembly of an inner race.

Referring now to FIG. 2 which shows the state before the assembly of the inner race 2, the rollers 15 are urged toward the meshing side by the springs 70, and the diameter B of the inscribed circle of the roller 15 to the inner race 2 is smaller than the diameter A of the inscribed circle of the pad bearing 10 to the inner race 2.

When in this state, the inner race 2 is axially inserted, the inner race 2 first contacts with the rollers 15, and to insert the inner race 2 further inwardly, the rollers 15 must be pushed aside and the inner race 2 or the outer race 1 must be pushed in while being rotated toward the idle rotation side (in the direction of arrow Z in FIG. 1).

Figure 3:
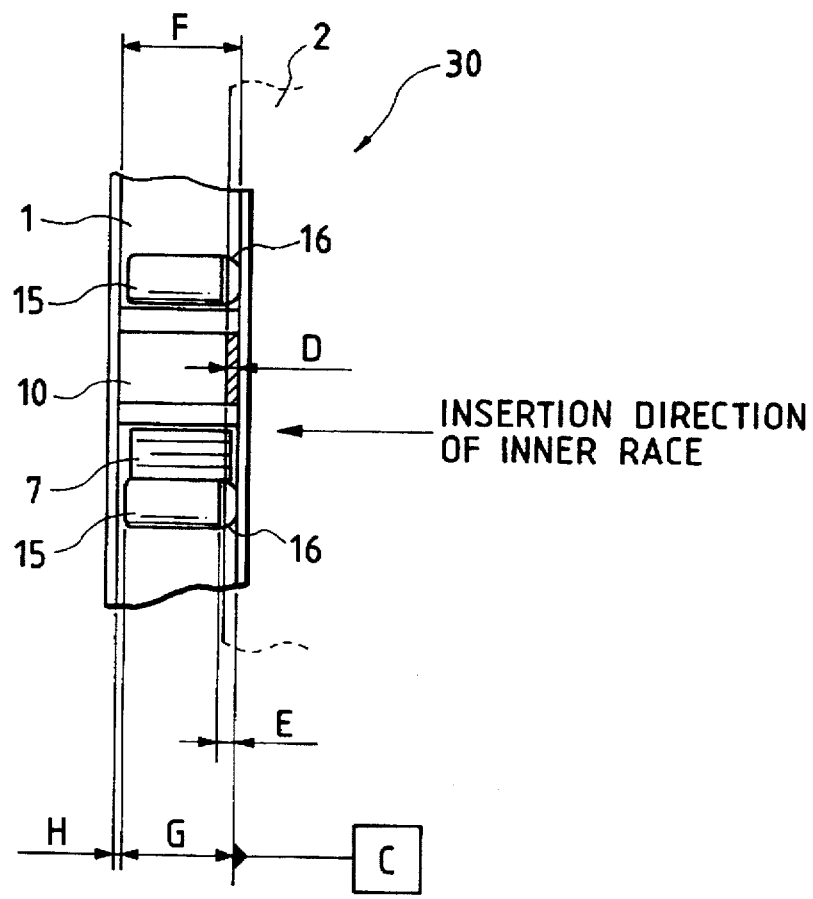
FIG. 3 shows the dimensional relation between a roller and a pad bearing during the assembly of the inner race in the embodiment of FIGS. 1 and 2.

In the present embodiment, however, as shown in FIG. 3, a chamfered portion 16 is provided on the axial end portion of each roller 15 on the insertion direction side of inner race 2 over the entire periphery of the roller in the circumferential direction thereof and therefore, the inner race 2 contacts with the axial edge portion of the pad bearing 10 before it contacts with the plurality of rollers 15. Accordingly, there is not the cumbersomeness caused by the difficulty in assembling resulting from the fact that a number of rollers 15 present in the circumferential direction do not uniformly move in the direction of idle rotation, and it is not necessary to use a special assembling jig for that reason.

In FIG. 3, when the axial end portions of the rollers 15 and the pad bearing 10 are brought into the same plane state C on the insertion direction side of the inner race 2, immediately before the inner race 2 contacts with the rollers 15, the insertion allowance D relative to the pad bearing 10 and the end portion chamfer dimension E of the chamfered portion 16 of each roller 15 may be equal to each other, but may preferably be D<E.

Also, when the axial width of the pad bearing 10 is F and the axial length of each roller 15 is G, it is preferable that F>G. This is because there arises a difference H (>0) between the axial width F of the pad bearing 10 and the axial length G of each roller 15 and thus the insertion allowance of the inner race 2 further increases by an amount corresponding to the difference H.

Figure 4:
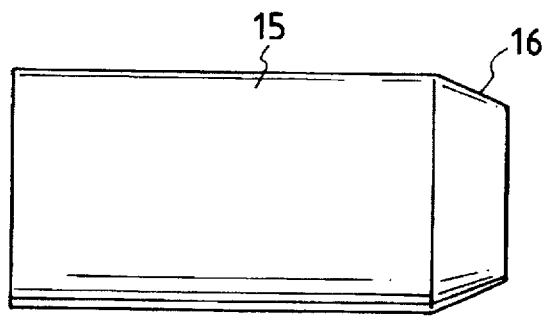
FIG. 4 is a front view of the roller showing an example of the chamfered portion of the roller.
Figure 5:
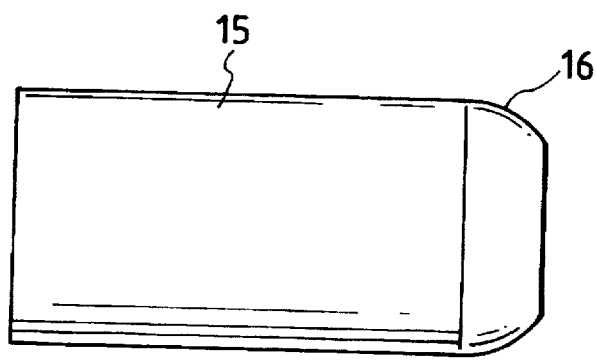
FIG. 5 is a front view of the roller showing another example of the chamfered portion of the roller.
Figure 6:
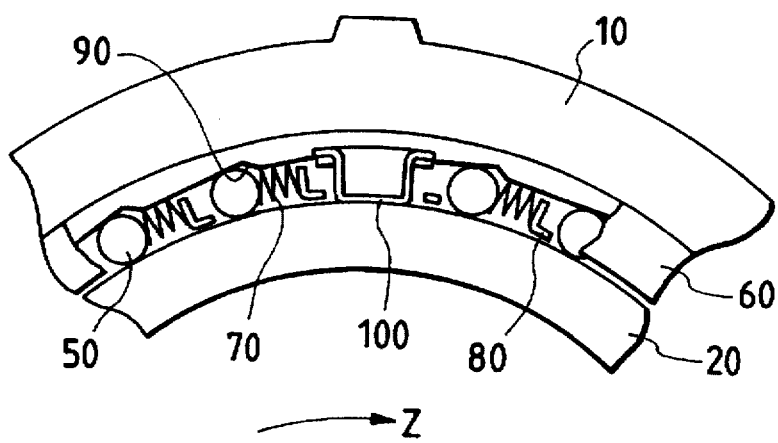
FIG. 6 is a partly broken-away radial cross-sectional view of a roller type one-way clutch according to the prior art.
Figure 7:
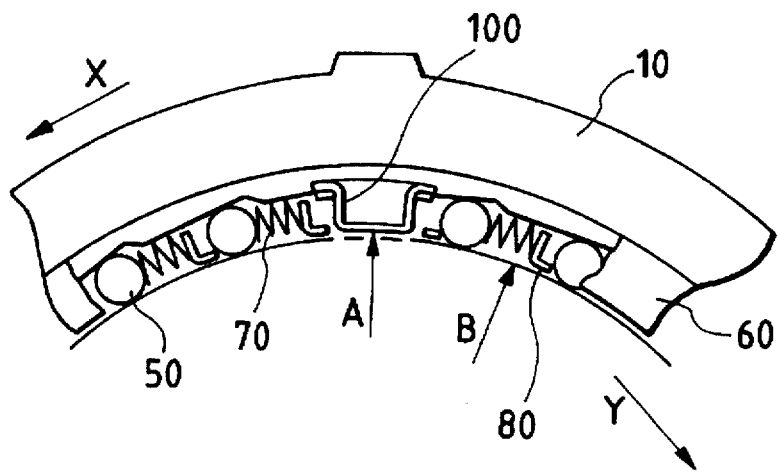
FIG. 7 is a radial cross-sectional view of the roller type one-way clutch of FIG. 6 showing the state before the assembly of an inner race.

The chamfered portion 16 of each roller 15 will now be described. The chamfered portion 16, as shown in FIG. 4, can be formed by stamping or cutting the axial end portion of the roller 15 so as to become straight as viewed from the front of the roller 15. Also, as shown in FIG. 5, it can be formed by stamping or cutting the axial end portion of the roller 15 so as to become arcuate as viewed from the front of the roller 15.

Figure 8:
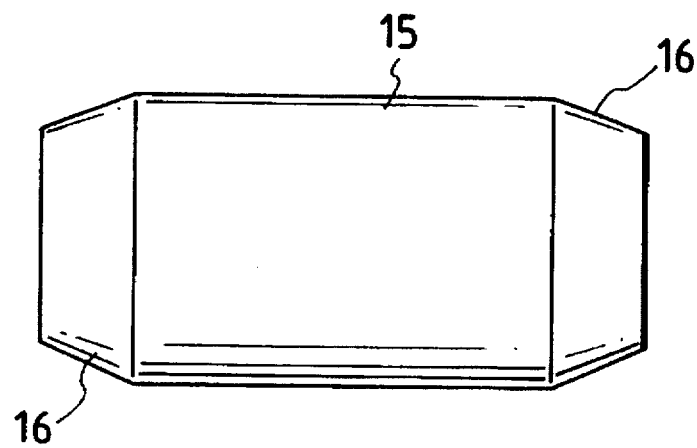
FIG. 8 is a front view of a roller showing an example in which the chamfered portion of the roller shown in FIG. 4 is provided on each of the axial opposite ends of the roller.
Figure 9:
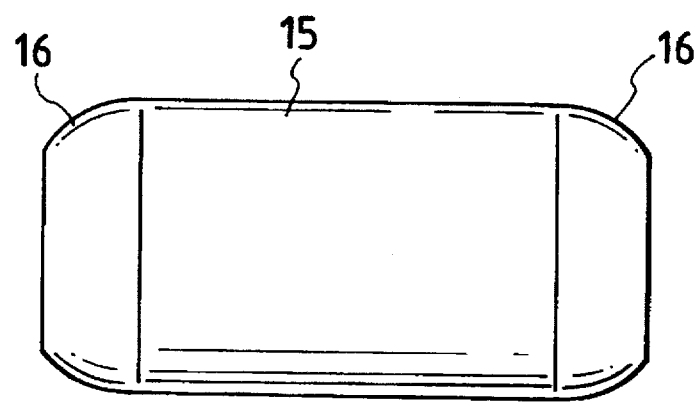
FIG. 9 is a front view of a roller showing another example in which the chamfered portion of the roller shown in FIG. 5 is provided on each of the axial opposite ends of the roller.

While in the embodiment, the chamfered portion 16 of the roller 15 is provided only on one axial end portion of the roller 15, it may of course be provided on each of the axial opposite end portions of the roller as shown in FIGS. 8 and 9. With such a construction, it will become unnecessary to uniformize the direction of the chamfered portion 16 when the rollers are assembled to the outer race.

As described above, according to the roller type one-way clutch of the present invention, there are obtained the following effects.

Before the inner race contacts with the rollers, the inner race is centered by the pad bearing, whereby it becomes unnecessary to use a special assembling jig and the number of steps of assembling the roller type one-way clutch is not increased and the working property of assembly can be improved.

What is claimed is:

1. A roller type one-way clutch comprising an outer race having an axially extending annular inner peripheral cam surface, an inner race disposed inside said outer race and having an annular outer peripheral raceway surface, said outer race and said inner race being disposed concentrically with each other for rotation relative to each other, a roller member disposed between said outer race and said inner race for transmitting a torque between said outer peripheral raceway surface and said inner peripheral cam surface, and a pad bearing for centering said inner race relative to said outer race, wherein said roller member has on at least one of axially opposite end portions thereof a chamfered portion chamfered over the entire periphery of said one end portion and wherein the axial width of said pad bearing is greater than the axial length of said roller member.

2. A roller type one-way clutch according to claim 1, wherein a said chamfered portion is provided on each of the axially opposite end portions of said roller member.

3. A roller type one-way clutch according to claim 1, wherein the insertion allowance of said inner race relative to said pad bearing is shorter than the axial length of the chamfered portion of said roller member.

* * * * *